United States Patent [19]

Vohr

[11] 4,323,286
[45] Apr. 6, 1982

[54] THRUST BEARING COOLING APPARATUS

[75] Inventor: John H. Vohr, Schenectady, N.Y.

[73] Assignee: General Electric Co., Schenectady, N.Y.

[21] Appl. No.: 172,904

[22] Filed: Jul. 28, 1980

[51] Int. Cl.³ ............................................. F16C 17/06
[52] U.S. Cl. ..................................... 308/160; 308/26; 308/76; 308/170
[58] Field of Search ................. 308/160, 170, 9, 76, 308/77, 26, DIG. 15

[56] References Cited

U.S. PATENT DOCUMENTS

| | | | |
|---|---|---|---|
| 3,004,804 | 10/1961 | Pinkus et al. | 308/73 |
| 3,339,990 | 9/1967 | Wendt | 308/73 |
| 3,454,312 | 7/1968 | Bielec | 308/160 |
| 3,545,828 | 12/1970 | Korrenn | 308/160 |
| 3,549,215 | 12/1970 | Hollingsworth | 308/73 |
| 3,625,576 | 12/1971 | Miller et al. | 308/9 |
| 3,784,266 | 1/1974 | Parlevliet | 308/160 |
| 3,891,281 | 6/1975 | Jenness | 308/1 R |
| 3,905,657 | 9/1975 | Ishida et al. | 308/73 |
| 3,982,796 | 9/1976 | Hill | 308/122 |
| 4,116,503 | 9/1978 | Licht | 308/160 |
| 4,213,657 | 7/1980 | Gray | 308/160 |
| 4,239,300 | 12/1980 | Adler | 308/9 |

Primary Examiner—Lenard A. Footland
Attorney, Agent, or Firm—Vale P. Myles

[57] ABSTRACT

A spring-mounted thrust bearing having pads that are immersed in lubricant and provided with coolant-distributing grooves in the face of each thrust pad is combined with a high pressure pumping means connected to force a flow of coolant between the thrust pad bearing surfaces and an associated runner surface in a high volume that is between ⅓ and ½ the flow rate of lubricant that is swept between those surfaces by normal relative rotation of the surfaces.

8 Claims, 4 Drawing Figures

THRUST BEARING COOLING APPARATUS

BACKGROUND OF THE INVENTION

The invention relates to a cooling apparatus for a high pressure, lubricant-flooded thrust bearing and, more particularly, relates to a system for continuously forcing a high volume of liquid coolant between the thrust pads and an associated runner bearing surface to cool the pads and runner sufficiently to enable them to effectively support a substantially heavier load, without damage to the bearing, than would otherwise be possible in the absence of the cooling system.

It has long been recognized that the load bearing capabilities of thrust bearings can be increased by maintaining the bearing surfaces at sufficiently low temperatures to prevent the metal of those surfaces from being softened sufficiently to cause wiping of the bearing. In addition to developing various systems for cooling the lubricant used to enable the bearing surfaces of thrust bearings to slide smoothly relative to one another, different types of thrust pad geometries have been developed to help control the load distribution and flow of lubricant between individual thrust pads of given bearings and their associated runner surfaces. In general, thrust bearings for supporting vertical loads are presently designed to use either a plurality of pivotally supported thrust pads in conjunction with a suitable thrust bearing runner surface, or are made to include a plurality of relatively more flexible thrust pads that are supported over most of their area by a set of compression springs in a manner such that the individual pads can flex or bend slightly relative to the substantially flat bearing surface of an associated runner bearing, to enable a predetermined amount of lubricant to be swept between the pads and the runner by rotation of the bearing surfaces relative to one another, in a generally well known manner.

In recent years, the unit-area loading of vertical thrust bearings has increased dramatically in the field of hydroelectric generation, because larger and larger rotor assemblies have been mounted in generators that afford very limited space to accommodate a thrust bearing assembly and any associated bearing cooling apparatus. Many of the prior art thrust bearing systems that were examined, in an attempt to discover a satisfactory solution to this problem of increasing bearing loadings restricted by relatively fixed confining limits on space available for the bearing system, reveal some structural features that are similar to some of the features of the invention disclosed herein. However, insofar as the applicant can ascertain, no prior art thrust bearing systems use the novel combination of structural features he employs to achieve the optimum bearing cooling function provided by his invention.

An example of a forced-feed lubrication system for a pivoted-shoe type of thrust bearing is disclosed in U.S. Pat. No. 3,004,804—Pinkus, et al. which issued on Oct. 17, 1961 and is assigned to the assignee of the present invention. A thrust bearing utilizing spring assemblies to support its individual thrust pads is disclosed, for example, in U.S. Pat. No. 4,168,101—DiGrande, which issued on Sept. 12, 1979 and is also assigned to the assignee of the present invention. The bearing cooling system disclosed in the Pinkus patent appears to be intended for use primarily with journal bearings, rather than with heavily loaded vertical thrust bearings of the type for which the present invention is particularly useful. Moreover, as explained in the specification of the Pinkus patent, the larger portion of lubricant entering between the respective bearing pads and an associated journal bearing surface is designed to enter the leading edges of the respective pivoted bearing pads thereby to furnish a supply of cool oil for formation of the normal wedge-shaped oil film upon which the shaft is intended to ride. At the same time a smaller portion of lubricant is introduced at the trailing edge of the respective pivoted bearing pads to act primarily as a cooling agent. Thus, it appears that the purpose of the Pinkus system is to cool lubricant as it is about to leave the respective bearing pads so that heat is not accumulated and transmitted from one pad to another.

In a somewhat related cooling system described in U.S. Pat. No. 3,339,990—Wendt, which issued July 13, 1964, there is disclosed a pivoted-block thrust bearing system for a shaft, in which system a lubricant supply passage to the respective thrust blocks of the bearing is provided generally parallel to the axis of the shaft. That system is designed to overcome one of the disadvantages of earlier systems that are designed to supply lubricant to pivoted thrust bearing blocks or pads. By positioning a lubricant inlet in the respective bearing blocks at a location thereon which remains in a substantially constant spatial relation to a supported shaft, the risk of breakdown in the supplied lubricant film of the system is somewhat diminished.

In other types of bearing systems, high pressure lubricant is used primarily to support a load on a hydrostatic film that is maintained under a predetermined pressure by forcing lubricant between selected bearing surfaces. An example of such a hydrostatic bearing system is shown in U.S. Pat. No. 3,545,824—Korrenn, which issued on Dec. 8, 1970. The high pressure lubricant forced into such bearings is intended primarily to form a load supporting surface, rather than being designed to assure appropriate cooling of the bearings; thus, the lubricant is forced into recesses defined in opposite surfaces of bearing blocks, near the center of those surfaces, rather than being introduced to thrust bearing pads in the manner used for the coolant in the invention disclosed herein.

In yet another prior art thrust bearing lubrication system, as disclosed in U.S. Pat. No. 3,784,266—Parlevliet, which issued Jan. 8, 1974, a high pressure pump is used to selectively control the flow of lubricant into grooves formed in the respective leading and trailing edges of each of the thrust pads of a thrust bearing. The flow of oil into these grooves is controlled to provide a means for altering the region of the thrust pads over which the bearing-lubricating film is developed. By thus controlling the lubrication film, the pivoting motion of the respective pads can be controlled in a desired manner, similar to the type of control that could be attained by varying the location of the pivot points for the respective thrust pads.

A common type of alternative thrust bearing cooling arrangement is generally similar in function to that described in the above noted patent to Pinkus, in the lubricant flowing between the respective thrust pads and runner bearing surfaces is cooled as it leaves each pad so that heat is not carried from one pad to an adjacent pad. An example of a prior art structure disclosing such a system is shown in U.S. Pat. No. 3,905,657—Ishida, which issued Sept. 16, 1975. In that system, a relatively low pressure supply of oil is injected into chambers, each of which respectively surround the different thrust pads of the bearing. Primary lubrication for the bearing is provided by flooding the bearing surfaces in a well known manner, but the low pressure lubricant introduced into the chambers surrounding the thrust pads operates to cool lubricant that is heated by its passage between the respective thrust pads and the bearing runner. A somewhat similar system is disclosed in U.S. Pat. No. 3,454,312—Bielec, which issued July 8, 1969. In that system, a plurality of spray heads are positioned between adjacent thrust pads of a thrust bearing. The spray heads operate to force cooling oil into the flow of lubricant that is carried from one thrust pad to another thereby to cool the lubricant between the respective thrust pads. In such common prior art systems, no high pressure coolant is forced directly between the thrust pads in the manner disclosed hereinafter relative to the present invention.

Other prior art patents disclose a variety of configurations of grooves and associated supply channels in thrust bearing pads to provide various lubricating functions. For example, U.S. Pat. No. 3,982,796—Hill, which issued Sept. 28, 1976 discloses a thrust bearing having thrust pads that are provided with a pair of grooves spaced respectively from the leading and trailing edge of each pad and are connected to oil supply conduits that are operable to selectively drain oil from a load bearing film between the thrust pads and the associated bearing runner thereby to provide a desired pressurized oil support for the respective thrust pads in lieu of a pivotal or multiple-spring support system. In general, the disclosure of Hill, thus, appears to be directed toward the type of function discussed above relative to the Parlevliet U.S. Pat. No. 3,784,266. Another U.S. Pat. No. 3,549,215—Hollingsworth, which issued Dec. 22, 1970 discloses a thrust pad system having grooves in the surfaces of thrust pads and associated conduits for supplying lubricant to the grooves. The system is operable to selectively bleed lubricant from the load supporting film in the manner generally discussed in the above-noted Hill patent. The primary purpose of such systems is to supply lubricating oil in controlled volume to the bearing surfaces, rather than to provide a cooling function for the bearing.

In addition to such lubricant supply and control systems, which are generally well known in the prior art, it is also a common practice to provide means for introducing high pressure lubricant between thrust pads and an associated runner bearing surface in order to lift a thrust bearing runner to initially start rotation of the runner relative to the pads. High pressure lubricant systems for performing such lifting functions to start rotation of a supported load are not designed to provide a continuous, relatively high volume of coolant between the bearing surfaces when the bearing operates at its normal speed. An example of a system that might be usable to perform such a lifting function is disclosed in U.S. Pat. No. 3,625,576—Miller, which describes a system of passageways formed in the bearing surfaces of a thrust bearing to deliver oil to supply grooves in the generally flat face of the bearing surface to form a lubricating film between that surface and a juxtaposed bearing surface.

Finally, it is known in the prior art to provide thrust bearing pads with grooves adjacent their respective leading and trailing edges coupled to oil supply conduit systems that are operable to selectively force a flow of lubricant to either of the grooves in the respective pads thereby to assure a predetermined supply of low pressure lubricating oil to the leading edge of each pad, regardless of the direction of rotation of an associated shaft or runner bearing surface. An example of such a system is disclosed in U.S. Pat. No. 3,891,281—Jenness, which issued June 24, 1975. Such systems are intended primarily to supply sufficient lubricant to form a lubricating film between the bearing surfaces, but are not designed to provide a relatively large flow of coolant between the bearing surfaces to cool them sufficiently to enable relatively heavy loads to be continuously supported on the thrust bearing pads in the manner of the invention disclosed herein.

While it is apparent from an examination of prior art bearing lubricating systems, such as those described in the foregoing patents, that it is common to design thrust bearing pads with a variety of groove patterns in their respective bearing surfaces and to couple lubricant supply systems to those grooves in order to selectively control the flow of lubricant to the bearing surfaces, for the various purposes noted above in the individual patents, there appears to have been little progress made in directly cooling the bearing surfaces of the individual thrust pads of such arrangements. Although the above noted Pinkus patent describes a thrust bearing system that utilizes a plurality of pivoted thrust pads having cooling oil introduced near the trailing edge of each of the respective pads to prevent heat from being carried by lubricant from one pad to the next pad, no prior art thrust bearing system known to the present applicant provides relatively flexible, spring supported thrust pads with distributing grooves and associated conduit supply means for introducing a large volume of high pressure coolant between the thrust pads and an associated runner bearing surface to cool a major portion of each of the thrust pads.

An object of the present invention is to provide a thrust bearing cooling apparatus that enables such bearings to be loaded to heretofore unattainable high levels per unit area while protecting the babbit metal surfaces of the bearings from damange due to excessive heating and resultant excessive wear or "wiping."

Another object of the present invention is to provide a flooded-type thrust bearing with flexible, spring-supported thrust pads that include coolant distributing grooves in the bearing face of each pad and associated conduit means that are operable to introduce a large volume of high pressure coolant between the thrust pad bearing surfaces and an adjacent bearing surface of a runner, thereby to cool substantially the entire working surfaces of the bearings, and to cool the flow of lubricant that is drawn between the bearing surfaces by normal relative rotation of those surfaces.

A further fundamental objective of the present invention is to provide a maximum temperature reduction of the bearing surfaces of a thrust bearing, while utilizing the least pumping power and smallest pump size possible to force coolant between the bearing surfaces to achieve such an optimum desired temperature reduction.

Still another object of the invention is to provide a thrust bearing cooling apparatus that is equally effective independent of the direction of rotation of a supported load on the bearing.

A still further object of the invention is to provide a thrust bearing cooling apparatus that is operable to pump liquid coolant into spaced grooves adjacent both the leading and trailing edges of each thrust pad of a bearing. The system operates to pump a larger volume of coolant into the distributing groove on the leading edge of each bearing pad than is pumped into the distributing groove adjacent the trailing edges of the thrust pads, thereby to optimize the cooling benefit afforded by the system.

Yet another object of the invention is to provide a thrust bearing cooling apparatus in which high pressure coolant is forced between spring supported, relatively flexible thrust pads and an associated runner bearing surface in a volume that is in the range of one-third to one-half the total flow rate of lubricant that is swept between those surfaces from a pool of liquid in which the thrust bearing is normally operated.

Further objects and advantages of the invention will become apparent to those skilled in the art from the description of it herein presented in connection with the accompanying drawings.

SUMMARY OF THE INVENTION

In a preferred embodiment of the invention, spring mounted thrust pads of a thrust bearing are immersed in lubricant and are provided with coolant-distributing grooves in the face of each thrust pad. The respective grooves are coupled to coolant conduit means for transmitting a large volume of high pressure coolant into the grooves and thence between the bearing surfaces of each thrust pad and an associated bearing runner. High pressure pumping means are connected to the conduit means to force a flow of coolant between these facing bearing surfaces that is in the range of one-third to one-half the flow rate of lubricant that is swept between them by normal relative movement of the bearing surfaces. The flow rate of the high pressure coolant and the location of the coolant distributing grooves in the thrust pads are selected to achieve a maximum degree of cooling of the thrust pads with the smallest practical pumping apparatus being required.

BRIEF DESCRIPTION OF THE PREFERRED EMBODIMENT

Figure 1:
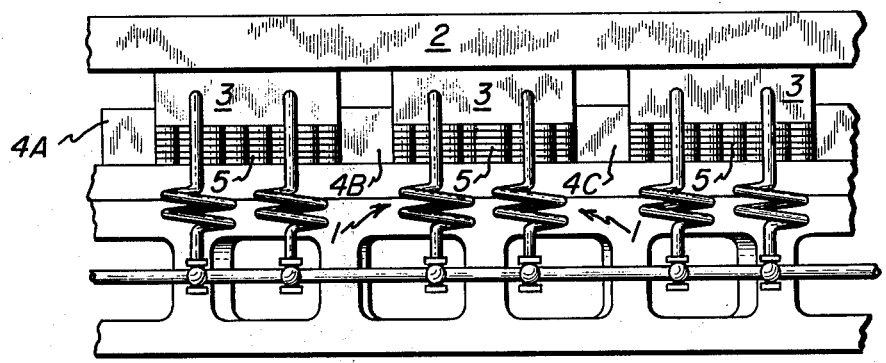
FIG. 1 is a side elevation view of a portion of a high pressure thrust bearing assembly showing several spring-supported thrust pads mounted on a frame between retainers and disposed in sliding relationship with a bearing runner. A high-pressure conduit means of a cooling apparatus constructed according to the present invention is partially shown connected to the illustrated pads.

The preferred embodiment of the invention disclosed herein will be described with reference to a high pressure thrust bearing of the type that utilizes spring supported, relatively flexible thrust pads that are flooded, or totally immersed, in lubricating oil during normal operation of the bearing. Critical parts of such a bearing are illustrated in FIG. 1, to which reference is now made. A portion of the bearing cooling apparatus 1 of the invention is shown connected to each of the several thrust pads depicted. The bearing itself comprises an annular runner 2 that has a substantially flat bearing surface on its lower side, in the perspective illustrated in FIG. 1. The bearing also includes a plurality of thrust bearing pads such as the pads 3, each of which include, respectively, substantially flat bearing surfaces on the upper sides thereof. A suitable retainer frame 4 that includes the frame member shown and a plurality of retainer arms 4A, 4B, 4C, etc. mounted in fixed relationship on the frame 4 at spaced points between the plurality of thrust pads 3, is positioned to retain the thrust pads against rotary movement relative to the frame.

Figure 2:
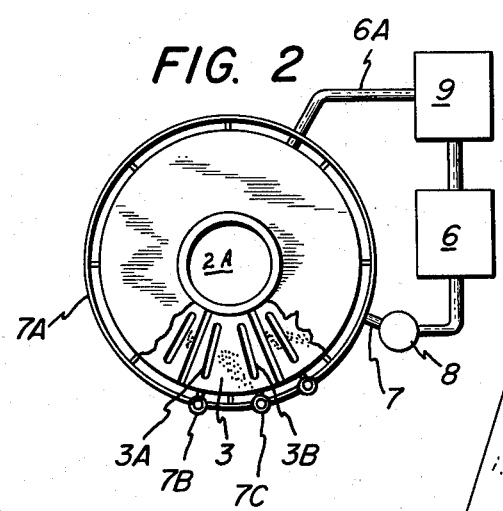
FIG. 2 is a top plan view of the thrust bearing that is partly shown in FIG. 1, illustrating coolant distributing grooves in the bearing surface of one of the thrust pads and further illustrating a conduit system, a high pressure pumping apparatus for forcing coolant into those grooves and a heat exchanger, all connected according to the invention.

As best seen in FIG. 2 of the drawing, the thrust pads 3 are disposed in a generally circular array with their respective bearing surfaces facing arcuately spaced portions of the bearing surface of the runner 2. Finally, the bearing includes a plurality of high pressure spring assemblies 5 that are arranged in sets or groups between the respective retainer arms 4A, 4B, 4C, etc. and support the thrust pads 3 in operating position on the frame 4. It will be understood that the runner bearing 2 is mounted in fixed relationship to a suitable shaft 2A, seen in FIG. 2 in cross-section, and the shaft is coupled in a conventional manner to support a rotatable load (not shown), such as the armature of an electric generator. Although not expressly illustrated in the figures of the drawing, all of the thrust pads 3 are totally immersed in oil so that when the bearing is placed in operation, movement of the runner 2 relative to the thrust pads 3 will cause oil to be swept between the thrust pads and the runner to lubricate those facing bearing surfaces in a manner generally well known in the art. Of course, a suitable housing or container (not shown) is disposed around the bearing assembly to retain the oil at a desired operating level, generally above the upper surface of the runner bearings 2, as is well known.

According to the present invention, the bearing cooling apparatus 1 in the disclosed embodiment comprises a suitable source 6 of coolant, which is a container filled with lubricating oil, in this embodiment. The coolant oil is of the same type and grade as is the oil lubricant used to flood the thrust pads 3 of the bearing. Accordingly, the coolant and lubricant comprise essentially the same liquid and, obviously, can be intermixed without adversely affecting the lubricating or cooling properties desired in practicing the invention. The coolant source 6 is connected by suitable high pressure commercially available conduit means 7 through a generally annular conduit 7A that surrounds the bearing, as generally illustrated in FIG. 2. A plurality of flexible conduit means such as the flexible tubular conduits 7B and 7C shown in FIG. 2 are connected to couple the annular conduit 7A to each of the respective thrust bearing pads 3. An essentially identical coupling is used in the case of each thrust bearing pad 3, thus further description of characteristic details of that coupling will be given, with reference to one of the pads shown in FIG. 3, after other features of the cooling apparatus of the invention are generally discussed. Each bearing surface of the respective thrust pads 3 is provided with a plurality of wall means, such as the wall means 3A and 3B shown in FIG. 2 and 3. According to the invention, each of the respective pads 3 include at least one wall means, such as either 3A or 3B, which defines at least one elongated groove in the bearing surface of each of the pads. In those embodiments where only a single groove is used, as may be the case for a bearing designed to rotate in only one direction, the grooves will be positioned near the leading edges of the respective pads, in the manner explained more fully below.

In addition to the conduit means 7, 7A–7C, etc. for conducting coolant from the coolant source 6 to each of the respective grooves 3A, 3B, etc. in the thrust pads 3, the cooling apparatus of the invention comprises a high pressure pumping means 8 that is operatively connected to pump a predetermined volume of coolant at high pressure through the conduit means and into the respective grooves in order to force coolant to flow between the annular runner 2 and each of the bearing surfaces of the respective thrust pads 3. A critical feature of the present invention is that the pumping means 8, which may be a suitable, commercially available hydraulic pump, must be operable to continuously produce a flow of coolant between the pads 3 and the bearing runner 2 at a flow rate of coolant that is in a range between one-third and one-half of the normal flow rate of the lubricant that is produced between those bearing surfaces from the pool of lubricant flooding the bearing, responsive to sliding movement of the runner 2 relative to the thrust pads 3 during operation of the bearing. That critical, large flow rate of the coolant is sufficient to enable the thrust bearing to effectively sustain substantially greater loading, without damage to the bearing, than is possible with any known prior art bearing cooling system or apparatus. At the same time, this optimum coolant flow rate can be provided with a relatively small pump and compact distributing means that can be accommodated in the limited space available for cooling large thrust bearings in hydro-generator installations.

By way of example, in a typical high pressure thrust bearing on which an embodiment of the invention was employed, the thrust pads 3 each have an inside diameter of about 13 and ½ inches and an outside diameter of 30 inches and are about 16½ inches in in axial length. Circumferentially each of those pads measured approximately 14 inches in length. During normal operation of that bearing, about 37 gallons per minute is the flow rate of lubricant swept between the combined thrust pad bearing surfaces and the bearing surface of the runner 2. In order to afford the desired optimum cooling of the thrust pad surfaces with a practically small pump means, according to the invention, so that extra high unit-area loading of the bearing can be achieved without adversely damaging the bearing surfaces, the pump means 8 was operated to produce a flow of about 13 gallons per minute, in total for all the thrust pads, through the grooves in respective surfaces of the bearing thrust pads and thence between those surfaces and the matching surface of the runner 2. Thus, generally speaking, those two flow rates equaled about 3.7 gallons per minute of lubricant swept over each thrust pad from the pool of lubricant, and a flow of about 1.3 gallons per minute of high pressure coolant forced between each thrust pad surface and an associated facing portion of the bearing runner surface 2.

As noted above, in the disclosed preferred embodiment of the invention two grooves 3A and 3B are positioned in the bearing surfaces of each of the thrust pads; however, in alternative embodiments of the invention significant cooling can be obtained by using only a single groove, such as the groove 3A, positioned adjacent the leading edge of each thrust pad. In such an embodiment, it would be assumed that the bearing is only intended to be operated in a single direction so that a high volume of coolant would be introduced adjacent the leading edge of each thrust pad, rather than near the respective trailing edges of the pads.

It has been found that in the disclosed preferred embodiment of the invention the two grooves 3A and 3B in the respective thrust pads are preferably spaced, respectively, from the leading and trailing edges of the pads a distance about equal to one-sixth of the distance between the leading and trailing edges of the pads. This arrangement optimizes the cooling effect of the coolant, while preventing undesirable spillage of the coolant from the edges of the pads.

Figure 4:
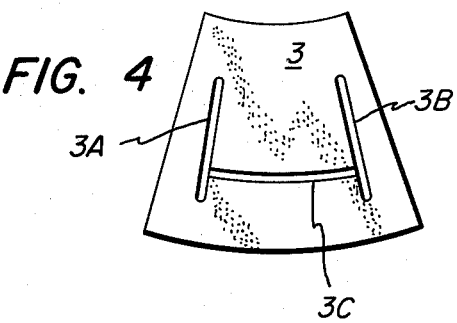
FIG. 4 is a plan view of an outline of a thrust pad illustrating an alternative form of coolant-distributing grooves used in a modified form of the system shown in FIG. 2.

In yet another embodiment of the invention, as illustrated in FIG. 4, the wall means defining grooves in the face of the respective bearing pads includes a third groove 3C in each of the respective pad bearing surfaces. Each of these third grooves 3C extends between and in coolant-receiving relationship with the first two spaced grooves 3A and 3B. Such a third groove can be spaced at various locations relative to the axis of rotation of the bearing, but in the preferred embodiment the third groove is spaced inwardly from the lateral edges of each pad a distance at least as great as 25% of the distance between the lateral edges of the pad. This arrangement prevents excessive loss of coolant over the lateral edges of the pads during normal operation of the bearing.

In the disclosed preferred embodiment, the pump means 8 is positioned in the conduit 7 between the source of coolant 6 and the annular common conduit 7A; however, in alternative embodiments of the invention, the pump means can be arranged to develop a high pressure directly on the lubricant that at least partially fills the container defining source 6. In either case, it will be understood that a common pressure is applied to each of the coolant distributing grooves 3A, 3B, 3C in the respective thrust pads 3, according to the invention.

Figure 3:
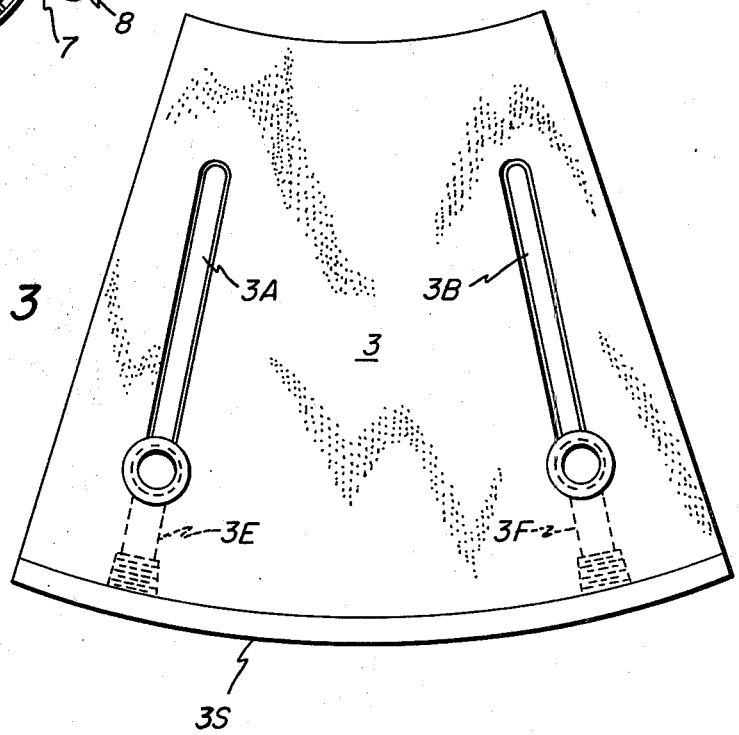
FIG. 3 is an enlarged top plan view of one of the thrust pads illustrated in FIG. 2, showing details of the coolant distributing grooves therein and details of conduit means (in phantom) in the thrust pads, whereby the grooves are connected to flexible conductors and thereby to the high pressure pump that supplies coolant to the face of the thrust pads.

Each of the thrust pads 3 in the preferred embodiment of the invention disclosed, as illustrated in FIG. 3, includes a plurality of passageways, such as the passageways 3E and 3F illustrated in phantom, which are disposed respectively beneath the bearing surface of the pad and extend in coolant flow-conducting relationship between the grooves 3A and 3B in the pad and a side wall 3S of the pad. Each of these passageways are connected, respectively, to one of the flexible coolant-conducting conduit means 7B, 7C, etc. shown in FIG. 2. The flexible conduits are in turn connected in coolant-carrying relationship to the common conduit 7A. This arrangement enables the respective flexible conduits 7B, 7C, etc. to be operable to continuously conduct coolant to each of the respective passageways coupled therewith while all or part of the pads 3 are moved in reciprocating fashion toward and away from the bearing runner surface 2 during normal operation of the bearing.

The conduit means of the cooling apparatus of the invention further includes a conduit 6A, as seen in FIG. 2, which is connected in coolant-conducting relationship between the source of coolant 6 and the lubricant-flooded portion of a lubricant retainer (not shown) disposed around the bearing. Finally, in the preferred embodiment of the invention a conventional heat exchanger 9 is arranged in operating relationship in the return-flow conduit 6A, as seen in FIG. 2, and is operable to cool lubricant moved from the lubricant retainer around the bearings to the coolant source 6. Thus the overall cooling efficiency of the bearing cooling apparatus of the invention is improved by maximizing the removal of heat from the metal of the facing bearing surfaces, and then from the coolant that absorbs that heat.

It will be apparent to those skilled in the art from the description of the invention presented herein that various alternative embodiments and modifications of it may be made without departing from the true scope and spirit of the invention; accordingly, it is my intention to encompass within the following claims the true limits of the invention.

What I claim and desire to secure by Letters Patent is:

1. A bearing cooling apparatus for a high pressure, lubricant-flooded thrust bearing, which bearing comprises an annular runner with a substantially flat bearing surface, a plurality of bearing pads each including a substantially flat bearing surface, a retainer for holding all of said pads is a generally circular array with their bearing surfaces facing, respectively, arcuately-spaced portions of the bearing surface of said runner in sliding relationship therewith, and a plurality of resilient means disposed, respectively, between each of said pads and the retainer to resiliently bias the pads toward the runner; said cooling apparatus comprising a source of coolant, a plurality of wall means each define at least one elongated groove in the bearing surface of each of said pads, conduit means for conducting coolant from said source to each of said grooves, and high pressure pumping means operatively connected to pump a predetermined volume of coolant at high pressure through said conduit means and into said grooves thereby to force coolant to flow between the annular runner and each bearing surface of the respective pads, said predetermined volume being sufficient to produce between the runner and pad bearing surfaces a flow rate of coolant in a range between $\frac{1}{3}$ and $\frac{1}{2}$ of the flow rate of lubricant developed between said bearing surfaces, from the lubricant flooding the bearing, responsive to sliding movement of the runner relative to said pads.

2. A bearing cooling apparatus as defined in claim 1 wherein said wall means defines two spaced elongated grooves in the bearing surface of each of said pads 3. A bearing cooling apparatus as defined in claim 2 wherein each of the two grooves in each of said pads are spaced, respectively, from the leading and trailing edges of its pad a distance about equal to one-sixth the distance between said leading and trailing edges.

4. A bearing cooling apparatus as defined in claim 3 wherein said wall means also defines a third groove extending between and in coolant-receiving relationship with said two spaced grooves in each of the pad bearing surfaces, said third groove being spaced inwardly from the lateral edges of its pad a distance at least as great as 25 percent of the distance between said lateral edges.

5. An invention as defined in claim 3 wherein said conduit means includes a plurality of passageways each disposed, respectively, beneath the bearing surface of one of said pads and in coolant flow-conducting relationship between the grooves in said pad and a side wall of the pad, and wherein said conduit means further includes a coolant-carrying conduit flexibly connected in common to each of said passageways at the respective ends thereof in said pad side walls, said flexibly connected conduit being operable to continuously conduct coolant to each of said passageways while all, or part, of the pads are alternately moved toward or away from the runner bearing surface.

6. An invention as defined in claim 5 wherein said conduit means includes a further conduit connected in coolant conducting relationship between the source of coolant and a lubricant-flooded portion of said retainer, said further conduit being operable to move lubricant from the retainer to said source of coolant.

7. An invention as defined in claim 6 including a heat exchanger operably arranged to cool lubricant moved from said retainer to the coolant source.

8. An invention as defined in claim 1 wherein said source of coolant includes a container at least partially filled with lubricant similar to a lubricant used to flood said bearing, in combination with a pump means arranged to develop a high pressure on the lubricant within said container, thereby to force lubricant from the container into each of said grooves under a common pressure.

* * * * *